(12) United States Patent
Galmiche

(10) Patent No.: US 12,418,228 B2
(45) Date of Patent: Sep. 16, 2025

(54) ROTATING ELECTRICAL MACHINE, SET OF SUCH MACHINES, AND ASSOCIATED BOAT AND ROLLING MILL

(71) Applicant: GE ENERGY POWER CONVERSION TECHNOLOGY LIMITED, Warwicksire (GB)

(72) Inventor: Christophe Galmiche, Champigneulles (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 77 days.

(21) Appl. No.: 18/505,962

(22) Filed: Nov. 9, 2023

(65) Prior Publication Data
US 2024/0195275 A1 Jun. 13, 2024

(30) Foreign Application Priority Data
Dec. 13, 2022 (EP) ..................................... 22306869

(51) Int. Cl.
*H02K 17/18* (2006.01)
*B21B 35/00* (2006.01)
*B63H 21/17* (2006.01)

(52) U.S. Cl.
CPC ............. *H02K 17/18* (2013.01); *B21B 35/00* (2013.01); *B63H 21/17* (2013.01)

(58) Field of Classification Search
CPC .......... H02K 17/18; H02K 17/22; H02K 1/30; H02K 17/16; B63H 21/17; B21B 35/00
See application file for complete search history.

(56) References Cited

U.S. PATENT DOCUMENTS

| 4,684,873 A | 8/1987 | Glennon |
| 4,942,323 A | 7/1990 | DeCesare |
| 4,945,296 A * | 7/1990 | Satake .................. H02K 16/04 310/116 |

(Continued)

FOREIGN PATENT DOCUMENTS

| DE | 102006038576 A1 | 4/2008 |
| DE | 102009015926 A1 | 10/2010 |

(Continued)

OTHER PUBLICATIONS

Extended European Search Report for EP Application No. 22306869.3 dated May 30, 2023, 13 pages.

*Primary Examiner* — Leda T Pham

(57) ABSTRACT

Described herein is a rotating electrical machine, set of such machines, and associated boat and rolling mill. The rotating electrical machine includes a stator, a shaft centered in the stator, a first cylindrical magnetic mass and a second cylindrical magnetic mass, the first cylindrical magnetic mass and the second cylindrical magnetic mass enclosing the shaft and arranged in series on the shaft, the first cylindrical magnetic mass and the second cylindrical magnetic mass being separated by an air gap, the stator including coils, each coil being opposite to the two cylindrical magnetic masses. Each cylindrical magnetic mass includes a stack of compacted laminated magnetic sheets, first fastening means configured to fix the first cylindrical magnetic mass and the shaft, and second fastening means configured to fix the second cylindrical magnetic mass and the shaft.

14 Claims, 8 Drawing Sheets

(56) References Cited

U.S. PATENT DOCUMENTS

| | | |
|---|---|---|
| 5,229,676 A | 7/1993 | Bood |
| 5,285,124 A * | 2/1994 | Satake ............... H02K 16/00 |
| | | 310/124 |
| 5,636,432 A | 6/1997 | Usher et al. |
| 5,844,341 A * | 12/1998 | Spooner ............. H02K 16/00 |
| | | 310/410 |
| 5,909,859 A | 6/1999 | Janicki |
| 6,789,764 B2 | 9/2004 | Bass et al. |
| 7,259,493 B2 | 8/2007 | Oshidari et al. |
| 7,397,156 B2 | 7/2008 | Mukai et al. |
| 7,397,157 B2 | 7/2008 | Maekawa et al. |
| 7,417,355 B2 | 8/2008 | Shichijo et al. |
| 7,466,053 B1 | 12/2008 | Radev |
| 7,797,815 B2 * | 9/2010 | Bremner ............ H02K 21/029 |
| | | 29/598 |
| 7,839,048 B2 | 11/2010 | Jansen et al. |
| 8,258,737 B2 | 9/2012 | Casey |
| 8,264,097 B2 * | 9/2012 | Numajiri ............. H02K 15/16 |
| | | 290/55 |
| 8,476,798 B2 | 7/2013 | Dooley et al. |
| 8,482,243 B2 | 7/2013 | Langreck |
| 8,643,238 B2 | 2/2014 | Ling |
| 8,710,708 B2 | 4/2014 | Dooley et al. |
| 9,143,013 B2 | 9/2015 | Yamada et al. |
| 9,283,836 B2 | 3/2016 | Oriet |
| 9,450,470 B2 | 9/2016 | Galmiche |
| 9,479,037 B2 * | 10/2016 | Bailey ................... B63H 21/14 |
| 9,499,263 B2 | 11/2016 | Youngblood |
| 10,199,894 B2 | 2/2019 | Lan et al. |
| 10,350,984 B2 | 7/2019 | Bangura et al. |
| 10,574,123 B2 | 2/2020 | Coldwate et al. |
| 10,756,606 B2 * | 8/2020 | Galmiche ............. H02K 7/003 |
| 10,770,938 B2 | 9/2020 | Imfeld |
| 10,910,903 B2 | 2/2021 | Witczak et al. |
| 11,046,404 B2 | 6/2021 | Lin et al. |
| 11,186,185 B2 | 11/2021 | Haldeman et al. |
| 11,205,943 B1 | 12/2021 | Fu et al. |
| 11,218,064 B2 | 1/2022 | Herrman |
| 11,387,694 B2 | 7/2022 | Huang et al. |
| 11,387,724 B2 | 7/2022 | Zhu et al. |
| 2014/0103767 A1 | 4/2014 | Nadeau et al. |

FOREIGN PATENT DOCUMENTS

| | | |
|---|---|---|
| EP | 1634360 B1 | 2/2011 |
| EP | 3672023 B1 | 9/2021 |
| GB | 783249 A | 9/1957 |
| JP | S5211106 U | 1/1977 |
| JP | S528006 Y1 | 2/1977 |
| JP | 2017112778 A | 6/2017 |
| JP | 2018537348 A | 12/2018 |
| WO | 2011092812 A1 | 8/2011 |
| WO | 2017067412 A1 | 4/2017 |
| WO | 2020048279 A1 | 3/2020 |
| WO | 2021005304 A1 | 1/2021 |
| WO | 2022105213 A1 | 5/2022 |

* cited by examiner

ROTATING ELECTRICAL MACHINE, SET OF SUCH MACHINES, AND ASSOCIATED BOAT AND ROLLING MILL

CROSS-REFERENCE TO RELATED APPLICATIONS

This application is a national stage entry of European Application No. EP22306869.3, filed Dec. 13, 2022, which is incorporated herein by reference.

FIELD OF THE DISCLOSURE

The present disclosure concerns rotating electrical machines and relates more particularly to a rotating electrical machine having a stator and a shaft comprising two cylindrical magnetic masses in tandem, a boat comprising such a rotating electrical machine, and, a rolling mill comprising such an electrical rotating machine.

BACKGROUND OF THE DISCLOSURE

In this description, "boat" shall mean any type of motorized floating vessel or vehicle designed to be sailed.

A boat may comprise a diesel engine comprising a driving shaft driving a propeller of the boat and an electrical rotating machine used between the diesel engine and the propeller to add propulsive torque to the shaft in a motor mode or to add electrical power to the network in a generator mode.

In another embodiment, the boat comprises an electrical rotating machine driving a propeller of the boat, the boat having no diesel engine.

The electrical machine may reach up a power to 6 MW at a rotation speed varying from 50 rpm to 250 rpm according to the type of boat.

Generally, the rotating electrical machine comprises a stator and a rotor comprising a rotor shaft comprising a shaft collar and a magnetic mass fixed on the shaft collar generally with bolts.

The rotor shaft is connected at each of its ends to the driving shaft and between the propeller and the diesel engine or is connected at one of its ends to the propeller if the boat does not comprise a diesel engine.

The rotating electrical machine is generally an induction machine with a wounded rotor or a squirrel cage rotor, or a synchronous machine made of either a permanent magnet rotor or a wounded rotor.

As the required torque generated by the said machine in the motor mode or the electrical power generated by the said machine in the generator mode is still increasing, it is known to increase the diameter of the magnetic mass and of the stator to meet such requirements.

As the electrical machine may be implemented in the boat, the space reserved for each machine is limited.

Generally, the boat architect determines a maximal distance between an electrical machine bracket on which lies the electrical machine and the center of the driving shaft.

The maximal distance imposes the maximal diameter of the magnetic mass.

As the maximal diameter of the magnetic mass is limited, the maximal torque and the electrical power generated by the electrical machine is limited and may not meet the required generated torque and the required generated electrical power.

Further, as the forces applied on the bolts connecting the rotor magnetic mass to the rotor shaft are proportional to the inertia of the magnetic mass and to the rotating speed of the rotor, when the shaft is decelerating, the rotor may reach a deceleration up to 40 rad·s$^{-2}$ generating huge torques on the bolts susceptible to deteriorate the bolts.

As the inertia of such a rotor is significant, the rotating inertia of other elements connected to the driving shaft, such as the propeller, may generate torsional resonance on the rotor shaft and on the driving shaft.

The torsional resonance may reach torsional acceleration up to 40 rad·s$^{-2}$ generating huge torques on the bolts connecting the magnetic mass to the rotor shaft.

Such a rotating electrical machine may also be implemented in a rolling mill to drive rolls to roll steel strands.

The rotating electrical machine implemented in a rolling mill may reach up a power to 30 MW at a rotation speed varying from 100 rpm to 200 rpm depending of the type of rolling mill.

As the inertia of such a rotor is significant, the other main inertia connected to the shaft driving the rolls may generate torsional resonance on the rotor shaft of the said rotating electrical machine.

The torsional resonance may reach torsional acceleration up to 40 rad·s$^{-2}$ generating huge torques on the bolts connecting the magnetic mass to the rotor shaft.

Further, hen steel strands are inserted between the rolls, the rotor may reach a deceleration up to 100 rad·s$^{-2}$.

The document U.S. Pat. No. 7,797,815 discloses a permanent magnet electrical machine comprising a shaft assembly made of a first shaft comprising permanent magnets forming a first rotor and a second shaft comprising permanent magnets forming a second rotor.

As the permanent magnets are fixed on the first and second shaft to from the first and second rotors, the rotors are not removable.

Further, magnetic fields generate current losses (iron losses) in the first and second shafts deteriorating the efficiency of the permanent magnet electrical machine.

Transporting, manufacturing, assembling or repairing a permanent magnet rotor can be very complex and requires non-magnetic tools.

The permanent magnets may be replaced by coils to form a synchronous machine.

However, the first and second rotors are not demountable.

Further, the magnetic fields generate current losses (iron losses) in the first and second shafts.

It is therefore proposed to remedy in whole or in part the disadvantages related to the electrical machines comprising magnetic masses fixed on shaft collars of rotor shafts according to the prior art.

SUMMARY OF THE DISCLOSURE

The present disclosure discloses a rotating electrical machine comprising a stator, a shaft centered in the stator, a first cylindrical magnetic mass and a second cylindrical magnetic mass, the first cylindrical magnetic mass and the second cylindrical magnetic mass enclosing the shaft and arranged in series on the shaft, the first cylindrical magnetic mass and the second cylindrical magnetic mass being separated by an air gap, the stator including coils, each coil being opposite to the two cylindrical magnetic masses.

Each cylindrical magnetic mass comprises a stack of compacted laminated magnetic sheets, first fastening means configured to fix the first cylindrical magnetic mass and the shaft, and second fastening means configured to fix the second cylindrical magnetic mass and the shaft.

Advantageously, each cylindrical magnetic mass comprises a set of coils so that the first cylindrical magnetic mass forms a first wounded rotor and the second cylindrical magnetic mass forms a second wounded rotor.

Preferably, each cylindrical magnetic mass comprises a set of coils, each coil of the set of coils of the first cylindrical magnetic mass being connected to a different coil of the set of coils of the second cylindrical magnetic mass so that the first and second cylindrical magnetic masses form a wounded rotor.

Advantageously, each cylindrical magnetic mass comprises conductive bars and two short circuit disks or two short circuit rings to form a squirrel cage, the first cylindrical magnetic mass forming a first squirrel cage rotor and the second cylindrical magnetic mass forming a second squirrel cage rotor.

Preferably, the first cylindrical magnetic mass comprises a first set of conductive bars and a first short circuit disk and the second cylindrical magnetic mass comprises a second set of conductive bars and a second short circuit disk, each conductive bar of the first set being connected to the first short circuit disk and to a different conductive bar of the second set, the conductive bars of the second set being connected to the second short circuit disk, the first and second sets and the first and second short circuit disks forming a squirrel cage so that the first and second cylindrical magnetic masses form a squirrel cage rotor.

Advantageously the end of each conductive bar of the first set and the second set in contact with another conductive bar comprises a slanted slide.

Preferably, the diameter of the first cylindrical mass is equal to the diameter of the second cylindrical mass, the rotating electrical machine further comprises:
- a first full rim including a first central circular aperture, the first magnetic mass being fastened on the periphery of the first full rim,
- a second full rim including a second central circular aperture, the second magnetic mass being fastened on the periphery of the second full rim,
- a first shaft collar and a second shaft collar on the shaft, wherein:
  the first fastening means comprises a first shoulder on the periphery of the first shaft collar and first fixing means,
  the first full rim is into abutment against the first shoulder and is fixed to the first shaft collar by the first fixing means,
  the second full rim is into abutment against the second shoulder and is fixed to the second shaft collar by the second fixing means,
  the first shoulder comprises a first cylindrical surface in contact with the circumferential surface of the first central circular aperture and a first annular surface perpendicular to the first cylindrical surface in contact with the first full rim, and
  the second shoulder comprises a second cylindrical surface in contact with the circumferential surface of the second central circular aperture and a second annular surface perpendicular to the second cylindrical surface and in contact with the second rim.

Advantageously, the diameter of the first shaft collar is smaller than the diameter of the second cylindrical surface, and the first and second shoulders are oriented on the first and second shaft collars so that the second annular surface is facing the surface of the first shoulder opposite to the first annular surface of the first shoulder.

Preferably, the shaft comprises two half shafts, and wherein one shaft collar of the first and second shaft collars comprises two parts, a first half shaft comprising a first part and the second half shaft comprising the second part, the first part comprising the annular surface or the cylindrical surface of the shoulder of the said one shaft collar and the second part comprising the cylindrical surface or the annular surface of the shoulder of the said one shaft collar, the first and second half shafts being fixed together with second removable fastening means to form the shoulder of the said shaft collar, the first half shaft or the second half shaft comprising the other shaft collar of the first and second shaft collars.

Advantageously, the diameter of the first cylindrical mass is equal to the diameter of the second cylindrical mass, the rotating electrical machine further comprising a hollow cylindrical support part, the shaft comprising a first half shaft and a second half shaft, the cylindrical support part being inserted between the first half shaft and the second half shaft, and the first cylindrical magnetic mass and the second cylindrical magnetic mass being fixed on the periphery of the cylindrical support part, the first and second fastening means comprising the hollow cylindrical support part.

Preferably, the rotating electrical machine further comprises a third full rim and a fourth full rim enclosing the shaft, the first cylindrical magnetic mass being fixed on the periphery of the third full rim with the first fastening means, and the second cylindrical magnetic mass being fixed on the periphery of the fourth full rim with the second fastening means.

Advantageously, at least one magnetic mass of the first cylindrical magnetic mass and the second cylindrical magnetic mass is segmented in segments, each segment comprising a stack of segmented laminated magnetic sheets and a segmented support part separating the stack in two sets of segmented laminated magnetic sheets, the fastening means associated to the one magnetic mass fixing each support part on the shaft.

Another object of the invention relates to a set of rotating electrical machines comprising at least a first rotating electrical machine as defined above and a second rotating electrical machine as defined above, the shaft of the first rotating electrical machine being connected to the shaft of the second rotating electrical machine.

An object of the invention relates to a boat comprising at least one rotating electrical machine as defined above.

Another object of the invention relates to a rolling mill comprising at least one rotating electrical as defined above.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION

Throughout the application, the term "invention" has been used interchangeably with the term "disclosure".

Figure 1:
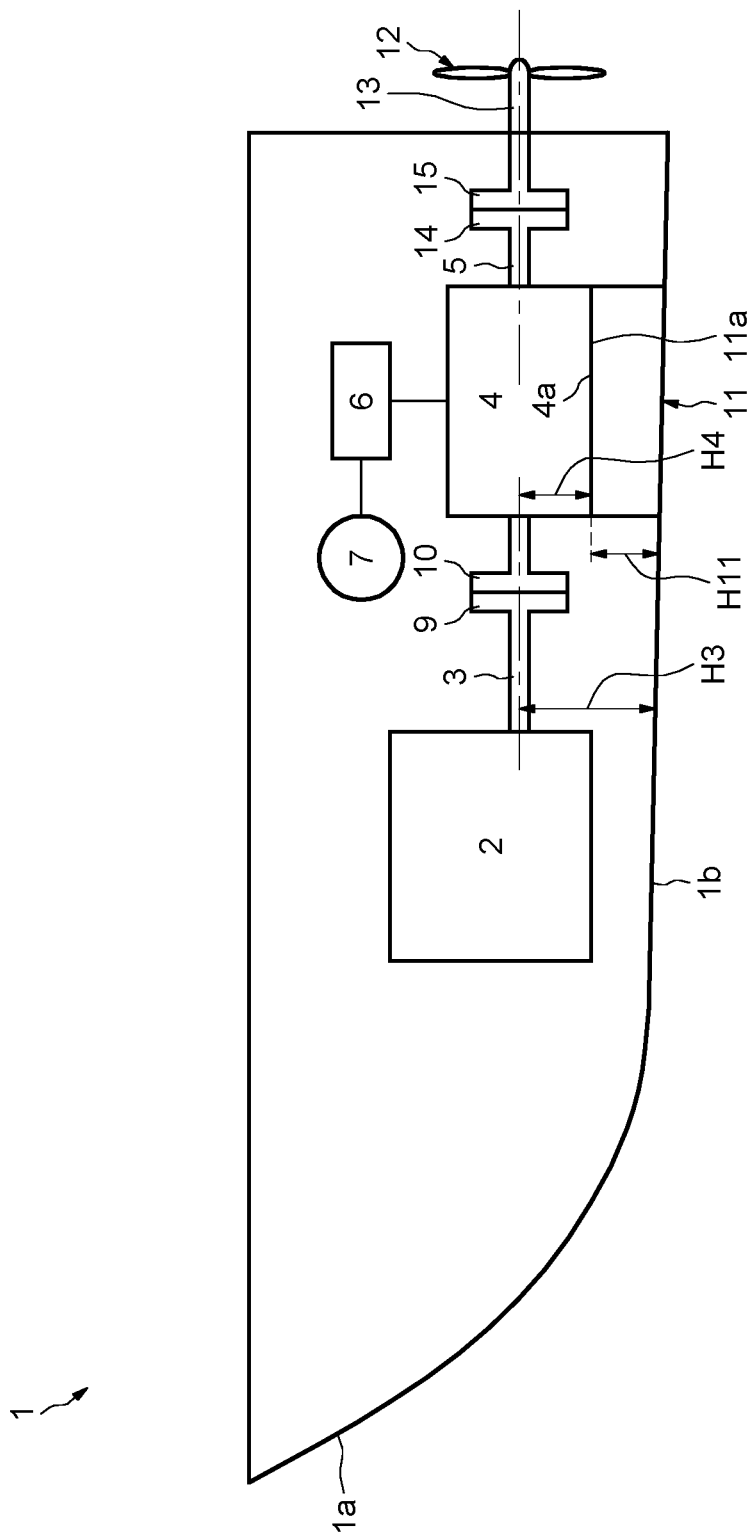
FIG. 1 illustrates an example of a boat according to the invention.

FIG. 1 illustrates an example of a boat 1 comprising a hull 1a having a base line 1b.

The boat further comprises a diesel engine 2 including an engine shaft 3, a rotating electrical machine 4 including a shaft 5, a reversible power converter 6 connected to the rotating electrical machine 4, and a power supply network 7 connected to the reversible power converter 6.

One end of the engine shaft 3 is connected to a first end of the shaft 5 for example with two coupling flanges 9, 10. One coupling flange 9 is at the said end of the engine shaft 3 and the other coupling flange 10 is at the first end of the shaft 5.

The distance between the base line 1b and the center of the engine shaft 3 is denoted H3 and may be determined by the boat architect according for example to the dimensions of the diesel engine 2.

The boat 1 further comprises a bracket 11 laying on the bottom of the hull 1a and a propeller 12.

The rotating electrical machine 4 is disposed on an upper surface 11a of the bracket 11 so that a base surface 4a of the rotating electrical machine 4 is in contact with the upper surface 11a of the bracket 11.

The upper surface 11a of the bracket 11 is opposed to the surface of the bracket 11 in contact with the bottom of the hull 1a.

The distance between the center of the shaft 5 of the machine 4 and the upper surface 11a of the bracket 11 is denoted H4.

The height between the base line 1b and the upper surface 11a of the bracket 11 at the closest end of the rotating electrical machine 4 to the diesel engine 2 is denoted H11.

The propeller 12 comprises a propeller shaft 13 connected to the second end of the shaft 5 for example with two coupling flanges 14, 15. One coupling flange 14 is at the second end of the shaft 5 of the machine 5 and the other coupling flange 15 is at the end of the propeller shaft 12.

The engine shaft 3 and the shaft 5 of the machine 4 form a driving shaft driving the propeller 12 to propel the boat 1.

The machine 4 may operate in a motor mode or in a generator mode.

In the motor mode, the machine 4 supplied by the power supply network 7 through the reversible power converter 6 generates a torque on the shaft 5 to assist the diesel engine 2.

In the generator mode, the shaft 5 of the machine 4 is driven by the engine shaft 3 so that the machine 4 generates electrical energy supplying the reversible power converter 6.

The power converter 6 supplies for example the power supply network 7 with the electrical energy power generated by the machine 4 in generator mode.

The boat 1 may comprise more than one network 7.

The reversible power converter 6 may be made from semiconductors, for example diodes, thyristors or piloted interrupters.

The diesel engine 2 may be replaced by a driving system generating a torque to drive the engine shaft 3, for example a propulsion electrical machine or a gas motor.

The shaft 5 and one or both of the engine shaft 3 and the propeller shaft 12 may be made of one shaft.

As the distances H3 and the heigh H11 are imposed, the distance H4 between the center of the shaft 5 of the machine 4 and the upper surface 11a of the bracket 11 is maximal equal to the distance H3 between the base line 1b and the center of the engine shaft 3 minus the height H11.

The torque generated by the machine 4 in motor mode is proportional to the magnetic fluxes generated by a stator and a rotor of the machine 4, in other words the torque generated by the machine 4 in motor mode is proportional to the circumferential surface of the rotor in opposite to the circumferential surface of the stator so that the torque generated by the machine 4 depends on the diameter of the stator and the diameter of the rotor.

As the distance H4 is imposed, the diameter of the stator and the diameter of the rotor are imposed.

Figure 2:
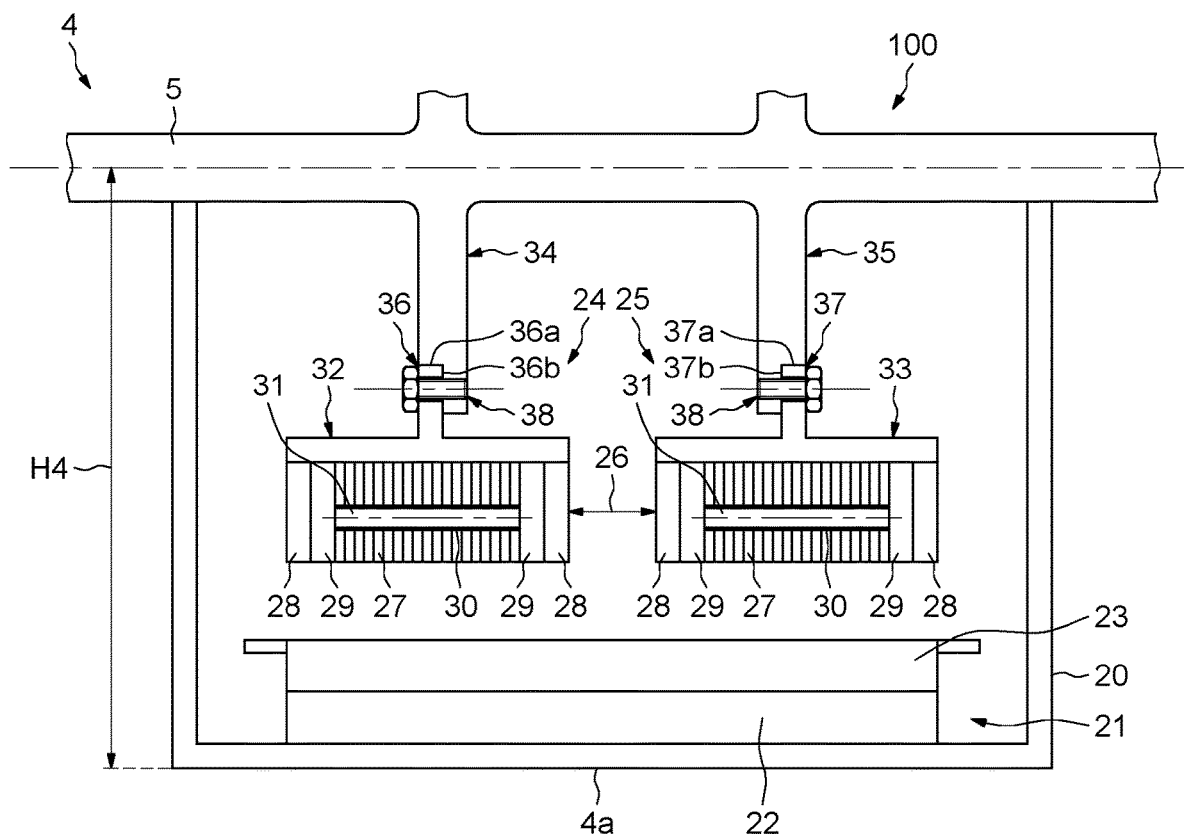
FIG. 2 illustrates a partial longitudinal cross section of an exemplary embodiment of an electrical machine according to the invention.

FIG. 2 illustrates a partial longitudinal cross section of an exemplary embodiment of the machine 4.

The machine 4 comprises a casing 20 having the base surface 4a.

The distance H4 between the center of the shaft 5 and the base surface 4a is maximal equal to the distance H3 minus the height H11.

The casing 20 encloses a stator 21 comprising a stator frame 22 and a stator magnetic mass 23, both being made for example of compacted magnetic laminated sheets.

The shaft 5 is centered in the stator 21.

The stator magnetic mass 23 comprises coils connected to the power converter 6.

The casing 20 further encloses a first embodiment of a moving set 100 comprising the shaft 5, a first cylindrical magnetic mass 24, and a second cylindrical magnetic mass 25.

The first cylindrical magnetic mass 24 and the second cylindrical magnetic mass 25 enclose the shaft 5 and are arranged in series on the shaft 5 so that the first cylindrical magnetic mass 24 and the second cylindrical magnetic mass 25 are separated by an axial air gap 26.

The first and second cylindrical magnetic masses 24, 25 are arranged in tandem on the shaft 5 and may have an identical diameter so that the radial air gap between the first and second cylindrical magnetic masses 24, 25 and the stator 21 is equal.

Each coil of the stator 21 extends along a direction longitudinal direction parallel to the shaft 5 so that each coil of the stator 21 is opposite to the first and second cylindrical magnetic masses 24, 25.

Each cylindrical magnetic mass 24, 25 comprises laminated magnetic sheets 27.

The first cylindrical magnetic mass 24 and the shaft 5 are fixed with first fastening means and the second magnetic mass 25 are fixed with second fastening means.

The first fastening means and the second fastening means may be identical or different.

Each magnetic mass 24, 25 comprises two compaction plates 28 connected together with ties rods (not represented) and tightening the magnetic laminated sheets to maintain the stacked magnetic laminated sheets compacted.

Each magnetic mass 24, 25 further comprises two short circuit disks 29, each short circuit disk 29 being inserted between one different compaction plate 28 and one end of the stack of magnetic laminated sheets 27.

In variant, the short circuit disks 29 may be replaced by short circuit rings.

Each magnetic mass 24, 25 further comprises housings 30 extending along the longitudinal direction and regularly disposed on a diameter of the said magnetic mass, each housing 30 lodging a conductive bar 31.

The short circuit disks 29 and a first set of conductive bars 31 of the first magnetic mass 24 form a first squirrel cage so that the first magnetic mass 24 and the shaft 5 form a first squirrel cage rotor.

Similarly, the short circuit disks 29 and a second set of conductive bars 31 of the second magnetic mass 24 form a second squirrel cage so that the shaft 5 and the second magnetic mass 25 form a second squirrel cage rotor.

In this exemplary embodiment, the machine 4 is an asynchronous machine comprising two squirrel cage rotors.

In variant, the squirrel cage of the first and second magnetic masses 24, 25 may be replaced with a first and a second set of coils so that the machine 4 is an asynchronous machine comprising two wounded rotors or so that the machine 4 is a synchronous machine comprising two wounded rotors, for example a saliant pole synchronous machine.

In another variant, the squirrel cage of the first and second magnetic masses 24, 25 may be replaced with permanent magnets so that machine 4 is a permanent magnet machine comprising two permanent magnet rotors.

The machine 4 may further comprise a first full rim 32 including a first central circular aperture and a second full rim 33 including a second central circular aperture.

The first full rim 32 and the second full rim 33 may be identical.

The first magnetic mass 24 is fastened on the periphery of the first full rim 32 and the second magnetic mass 25 is fastened on the periphery of the second full rim 33.

The shaft 5 may further comprise a first shaft collar 34 and a second shaft collar 35.

The first shaft collar 34 and the second shaft collar 35 may be identical.

The first shaft collar 34 may comprise a first shoulder 36 on its periphery, the first shoulder 36 comprising a first cylindrical surface 36a and a first annular surface 36b perpendicular to the first cylindrical surface 36a.

Similarly, the second shaft collar 35 may comprise a second shoulder 37 on its periphery, the second shoulder 37 comprising a second cylindrical surface 37a and a second annular surface 37b perpendicular to the second cylindrical surface 37a.

The first full rim 32 is into abutment with the first shoulder 36 so that the first cylindrical surface 36a is in contact with the circumferential surface of the first central circular aperture and the first annular surface 36b is in contact with the first full rim 32.

The first full rim 32 is fixed to the first shaft collar 34 with first fixing means.

The first fastening means comprise the first shoulder 36 and the first fixing means.

The second full rim 33 is into abutment with the second shoulder 37 so that the second cylindrical surface 37a is in contact with the circumferential surface of the second central circular aperture and the second annular surface 37b is in contact with the second full rim 33.

The second full rim 33 is fixed to the second shaft collar 35 with second fixing means.

The second fastening means comprise the second shoulder 37 and the second fixing means.

The first and second fixing means may be identical or different.

The first and second fixing means may comprise removable fixing means, for example screws 38 passing through the first and second full rim 32, 33 and being engaged in the first and second shaft collars 34, 35 so that the first and second fastening means are removable first and second fastening means.

In variant, the removable fixing means may comprise bolts.

The use of removable fixing means permits to easily dismount the first and second magnetic masses 24, 25 to facilitate transporting, manufacturing, assembling or repairing of the machine 4.

In variant, the first and second fixing means may comprise fixed fastening means so that the first and second fastening means are fixed first and second fastening means, the full rim being not dismantlable without deteriorating a rim and the associated shaft collar.

Fixed fastening means comprise for example solder between the said shaft collar and the said full rim.

The use of laminated magnetic sheets permits to reduce the current loses in the first and second rotors and the eddy currents.

Further, as the distance H4 is imposed, the machine 4 comprising two magnetic masses permits to increase the surface of magnetic masses in regard with the coils of the stator 21 to increase the torque generated by the machine 4 in motor mode or the electrical energy generated by the machine 4 in generator mode compared to a machine comprising a housing including a stator and only one magnetic mass known form the prior and having a distance between the center of the rotor shaft and the external surface of the housing laying on a bracket equal to the distance H4.

The arrangement of two magnetic masses 24, 25 on the shaft 5 further permits to distribute magnetic forces applied on the shaft 5 when the coils of the stator 21 are supplied to limit the deformation of the shaft 5 suppressing intermediate bearings generally arranged in machines known in the prior art.

The diameter of the magnetic masses 24, 25 is reduced compared to the diameter of a rotor magnetic mass of a machine known from the prior art generating the same torque or electrical energy as the machine 4 so that the inertia of the magnetic masses 24, 25 is reduced compared to the inertia of the rotor magnetic mass of a machine known from the prior art. The torque applied and the first and second fastening means during deceleration of the shaft 5 is reduced, and the occurrence of torsional resonance on the shaft 5 and on the driving shaft is reduced allowing to increase the admissible angular acceleration or deceleration, for example for a boat from usual 40 rad·s$^{-2}$ to more than 50 rad·s$^{-2}$rad, and for example for a rolling mill from 100 rad·s$^{-2}$ to more than 130 rad·s$^{-2}$.

The first and second fastening means are less stressed improving the duration of the machine 4.

Figure 3:
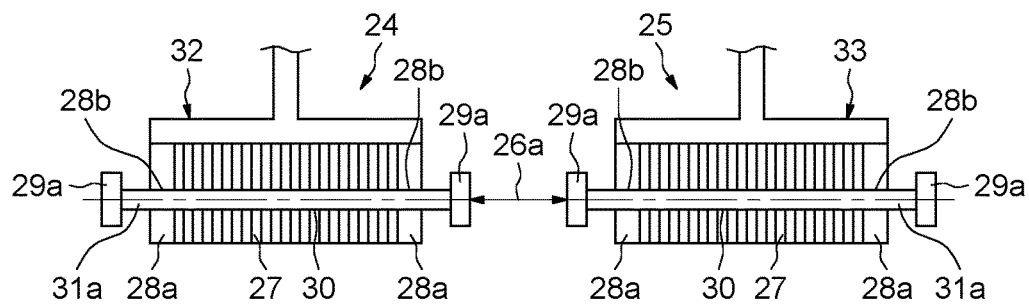
FIG. 3 illustrates a variant of magnetic masses according to the invention.

In another variant of the magnetic masses 24, 25 illustrated on FIG. 3, each magnetic mass 24, 25 comprises two compaction plates 28a connected together with ties rods (not represented) and tightening the magnetic laminated sheets 27 to maintain the stacked magnetic laminated sheets compacted.

Each compaction plate 28a comprises through holes 28b so that conductive bars 31a regularly arranged according to a diameter of the magnetic mass 24, 25 are lodged in the housing 30 and go through the through holes 28b.

Each end of the conductive bars 31a is connected to one of the two short circuit rings 29a located at each end of the magnetic mass 24, 25 and exceeding the magnetic mass 24, 25.

As the short circuit rings 29a exceed the magnetic mass 24, 25, the air gap 26a between the two magnetic masses 24, 25 is reduced compared to the air gap 26 separating the magnetic masses 24, 25 as illustrated on FIG. 2.

The variant of the magnetic masses 24, 25 illustrated on FIG. 2 permits to bring closer the magnetic masses 24, 25 in the longitudinal direction compared to the variant of the magnetic masses 24, 25 illustrated on FIG. 3 comprising short circuit rings 29a exceeding the magnetic masses 24, 25.

Bringing closer the magnetic masses 24, 25 in the longitudinal direction permits to reduce the length of the stator 21 so that the length of the magnetic mass 23 of the stator 21 is reduced reducing the weight of the stator 21, and so that the length of the coils in the magnetic mass 23 is reduced. The longitudinal length of the machine 4 is reduced so that the machine 4 is more compact and less heavy.

When the machine 4 is an asynchronous machine, the first and second magnetic masses 24, 25 comprise a squirrel cage or coils.

In case of a defect of the machine 4, the supply of the coils of the stator 21 is stopped or no current is induced in the squirrel cage so that no magnetic field is generated preventing the propagation of the failure.

Similarly, when the machine 4 is a synchronous machine, the direct current supply of the coils inserted in the first and second magnetic masses 24, 25 is stopped in case of a defect so that no magnetic field is generated preventing the propagation of the failure.

Figure 4:
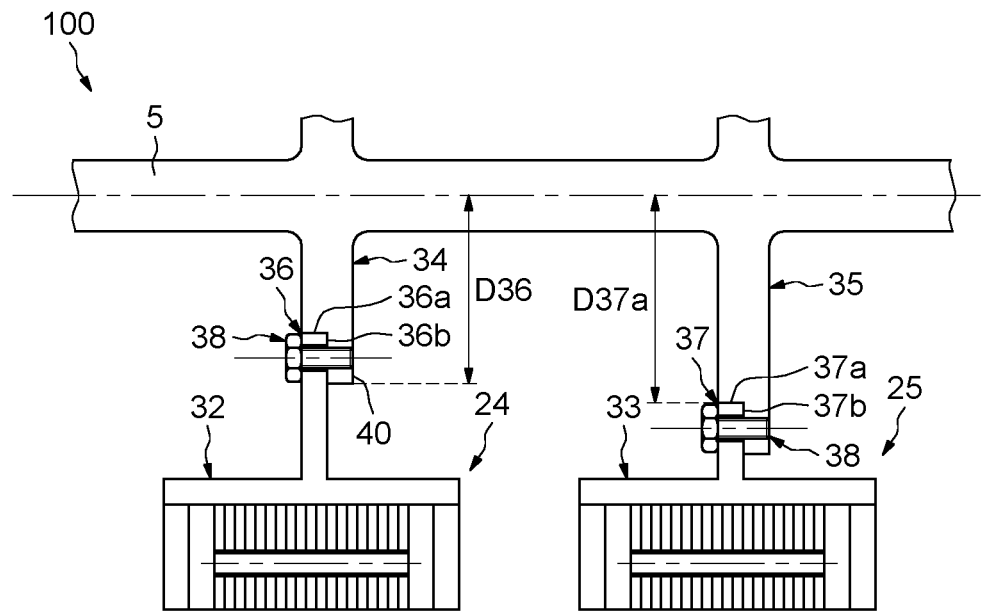
FIG. 4 illustrates a partial longitudinal cross section of a second example of a moving set according to the invention.

FIG. 4 illustrates a partial longitudinal cross section of a second embodiment of the moving set 100.

The second embodiment of the moving set 100 differs from the first embodiment of the moving set 100 illustrated on FIG. 2 in that the diameter of the first shaft collar 34 referenced D36 is smaller than the diameter of the second cylindrical surface 37a of the second shaft collar 37 referenced D37a.

The first and second shoulders 36, 37 are oriented on the first and second shaft collars 34, 35 so that the second annular surface 37b is facing the surface 40 of the first shoulder 36 opposite to the first annular surface 36b of the first shoulder 36.

The relative orientation of the first and second shoulders 36, 37 one to the other on the first and second shaft collars 34, 35 and the relative values of the diameters D36 and D37a one to the other makes the mounting or dismounting of the first and second magnetic masses 24, 25 easier on the shaft 5 when the first and second rotor is inserted in the stator 21, for example during repairing or maintenance operations of the machine 4.

For example, during the dismounting of the first and second magnetic masses 24, 25, the first fixing means are removed and the first magnetic mass 24 is removed from the stator 21 by translating the first magnetic mass 24 along the longitudinal direction.

Then the first magnetic mass 24 is removed from the stator 21, the second fixing means are removed.

As the diameter D36 is smaller than the diameter D37a, the second magnetic mass 25 is removed from the stator 21 by translating the second magnetic mass 25 along the longitudinal direction.

During the mounting of the first and second magnetic masses 24, 25, the second magnetic mass 25 is inserted in the stator 21 by translating the second magnetic mass 25 along the longitudinal direction until the second full rim comes in abutment into the second shoulder 37.

The second fixing means are inserted to fix the second full rim on the second shaft collar 35.

Then, the first magnetic mass 24 is inserted in the stator 21 by translating the first magnetic mass 24 along the longitudinal direction until the first full rim comes in abutment into the first shoulder 36, and the first fixing means are inserted to fix the first full rim on the first shaft collar 34.

In variant, the first and second magnetic masses 24, 25 are disposed in the stator 21 and the shaft 5 is translated in the stator 21 along the longitudinal direction until the first full rim comes in abutment into the first shoulder 36, and the first and second fixing means are inserted to fix the first full rim on the first shaft collar 34 and to fix the second full rim on the second shaft collar 35.

Figure 5:
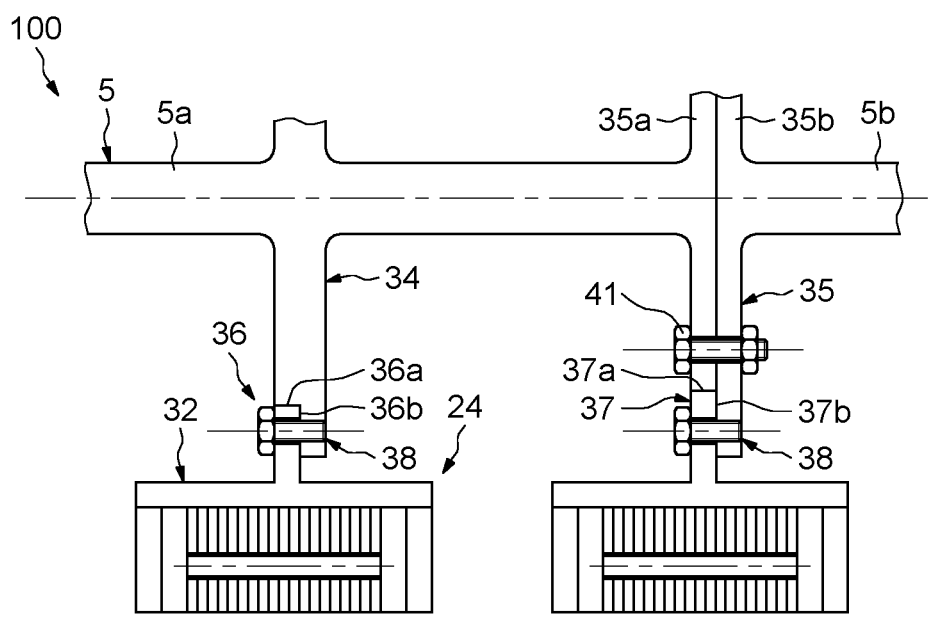
FIG. 5 illustrates a partial longitudinal cross section of a third example of the moving set according to the invention.

FIG. 5 illustrates a partial longitudinal cross section of a third embodiment of the moving set 100.

The third embodiment of the moving set 100 differs from the first embodiment of the moving set 100 in that the shaft 5 comprises two half shafts 5a, 5b and the second shaft collar 35 comprises two parts 35a, 35b.

The first half shaft 5a comprises the first part 35a and the first shaft collar 34.

In variant, the second half shaft 5b comprises the first shaft collar 34.

The second half shaft 5b comprises the second part 35b.

The first part 35a comprises the second annular surface 37a and the second part 35b comprises the second cylindrical surface 37a.

The first and second half shafts 5a, 5b are fixed together with second removable fastening means to form the second shoulder 37 of the second shaft collar 35.

The second removable fastening means may comprise bolts 41.

In variant, the first part 35a comprises the second cylindrical surface 37a and the second part 35b comprises the second annular surface 37a.

In variant, the first shaft collar 34 is formed from the first and second parts.

The shaft 5 comprising the two half shafts 5a, 5b fixed together with the second removable fastening means is easily dismountable when the shaft 5 and one or both of the engine shaft 3 and the propeller shaft 12 are made of one shaft.

Figure 6:
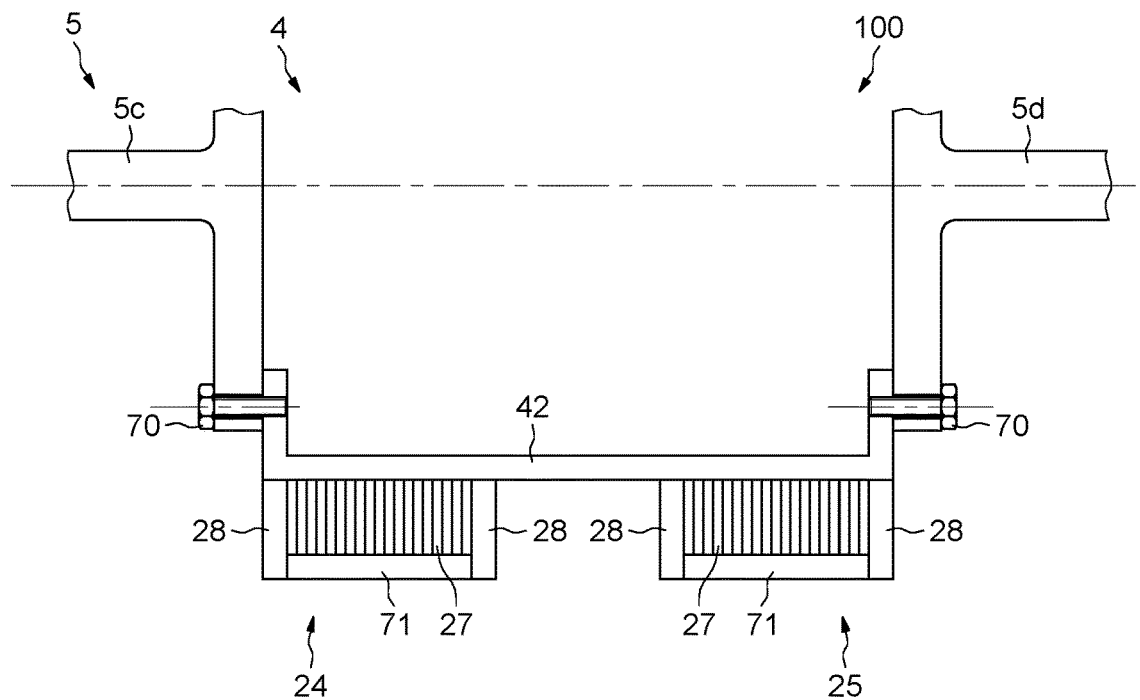
FIG. 6 illustrates a partial longitudinal cross section of a fourth example of the moving set according to the invention.

FIG. 6 illustrates a partial longitudinal cross section of a fourth embodiment of the moving set 100.

The shaft 5 comprises a first half shaft 5c and a second half shaft 5d.

The moving set 100 further comprises a hollow cylindrical support part 42 inserted between the first half shaft 5c and the second half shaft 5d.

In this embodiment, the first and second fastening means comprise the hollow cylindrical support part 42.

The cylindrical support part 42 is fixed on the first half shaft collar 5c and the second half shaft collar 5d with removable fastening means, for example screws 70 regularly disposed on a diameter of the said half shafts 5c, 5d, passing through the cylindrical support part 42, and inserted into the cylindrical support part 42.

The first and second magnetic masses 24, 25 comprise the laminated magnetic sheets 27 compacted between the two compaction plates 28 and are fixed on the periphery of the cylindrical support part 42.

The fixation of the first and second magnetic masses 24, 25 on the half shafts 5c, 5d with the hollow cylindrical support part 42 permits to rigidify the fixation of the first and second magnetic masses 24, 25 on the shaft 5.

As the cylindrical support part 42 is fixed with removable fastening means on the first and on the second half shafts, the cylindrical support part 42 is fixed on the shaft 5 with two fixing interfaces, each interface comprising the surface of the cylindrical support part 42 in contact with a half shaft 5c, 5d and comprising the surface of the said half shaft 5c, 5d in contact with the cylindrical support part 4 so that the moving set 100 may endure higher decelerations or accelerations without damaging the moving set 100.

Further, as the cylindrical support part 42 is hollowed, the inertia of the moving set 100 is not increased.

Each magnetic mass 24, 25 may further comprise permanent magnets 71 so that the shaft 5, the support part 42, and the first and second magnetic masses 24, 25 form two permanent magnet rotors, the machine 4 being a permanent magnet machine having two rotors.

In variant, the permanent magnets 71 may be replaced by a squirrel cage to form an asynchronous squirrel cage machine having two rotors.

In another variant, the permanent magnets 71 may be replaced by coils to form an asynchronous wounded machine having two rotors or a synchronous wounded machine having two rotors.

Figure 7:
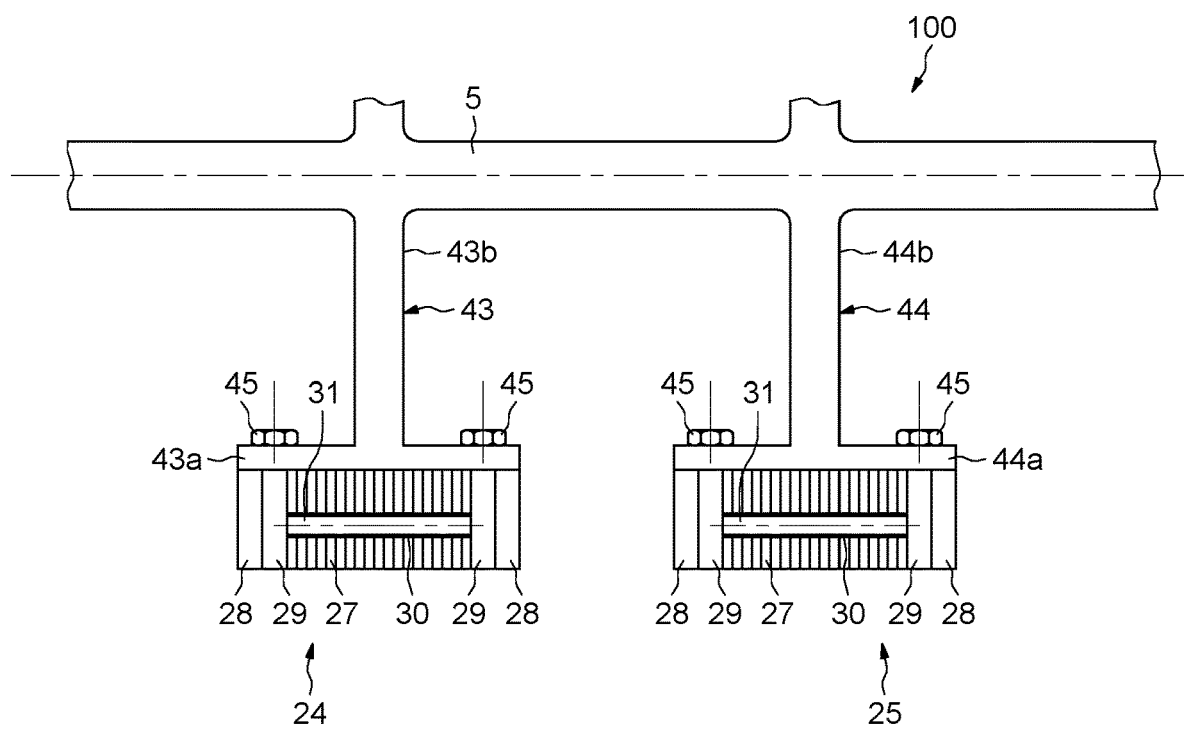
FIG. 7 illustrates a partial longitudinal cross section of a fifth example of the moving set according to the invention.

FIG. 7 illustrates a partial longitudinal cross section of a fifth embodiment of the moving set 100.

The shaft 5 comprises a third full rim 43 and a fourth full rim 44 enclosing the shaft 5.

The shaft 5, the third full rim 43 and the fourth full rim 44 may be a single piece obtained for example by forging, casting, or welding the full rims 43, 44 on the shaft 5.

Each full rim of the third full rim 43 and a fourth full rim 44 comprises an annular support part 43a, 44a and an intermediary part 43b, 44b connecting the annular support part 43a, 44a to the shaft 5.

The first and second magnetic masses 24, 25 comprise the laminated magnetic sheets 27 compacted between the two compaction plates 28 and are fixed on the periphery of the annular support part 43a, 44a with the first and second fastening means comprising for example screws 45 passing through the support parts 43a, 44a and inserted in the magnetic masses 24, 25.

The fixation of the first and second magnetic masses 24, 25 on the third full rim 43 and the fourth full rim 44 permits to rigidify the fixation of the first and second magnetic masses 24, 25 on the shaft 5 so that the moving set 100 may endure higher decelerations or accelerations without damaging the moving set 100.

Each magnetic mass 24, 25 may further comprise the short circuit disks 29 and the conductive bars 31 lodged in the housing 30, the first magnetic mass 24 comprising the first squirrel cage and second magnetic mass 25 comprising the second squirrel cage, the machine 4 being an asynchronous squirrel cage comprising two rotors.

In variant, the first and second squirrel cages may be replaced by permanent magnets to form a permanent magnet machine having two rotors.

In another variant, the first and second squirrel cages may be replaced by coils to form an asynchronous wounded machine having two rotors or a synchronous wounded machine having two rotors.

Figure 8:
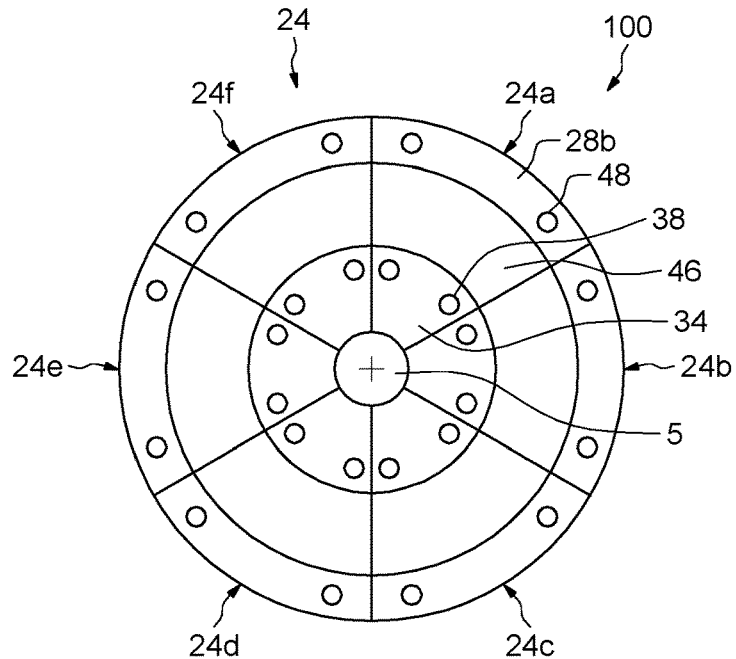
FIGS. 8 and 9 illustrate a partial longitudinal cross section of a sixth example of the moving set according to the invention.
Figure 9:
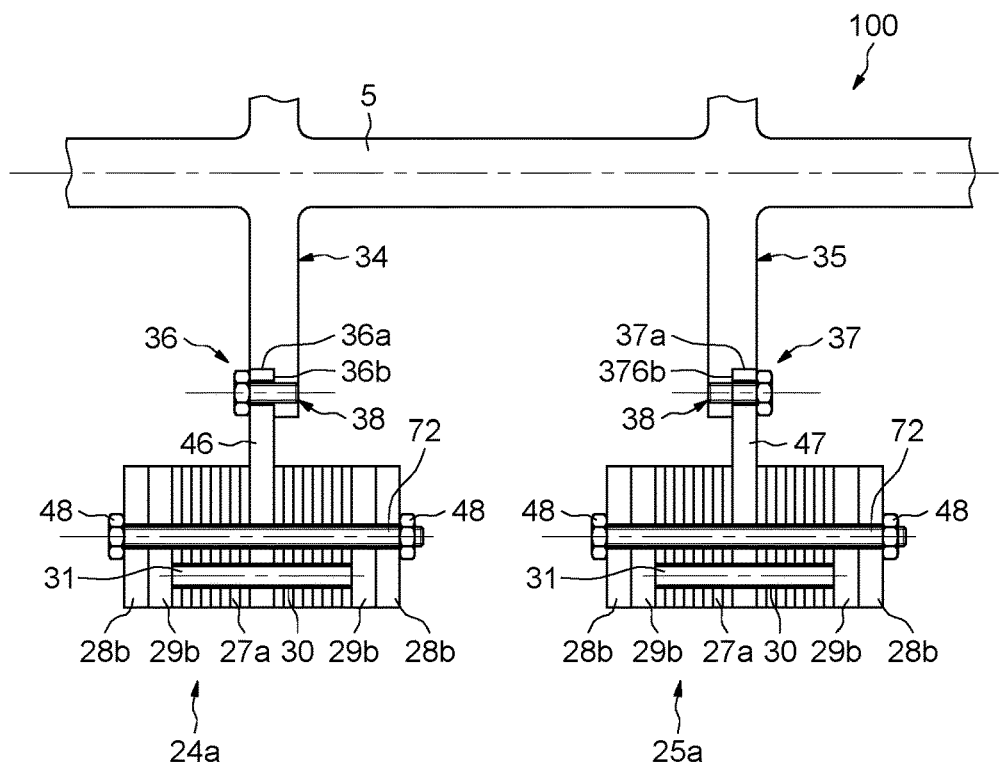

FIGS. 8 and 9 illustrates a sixth embodiment of the moving set 100.

The FIG. 8 illustrates a partial view of the sixth embodiment of the first magnetic mass 25 according to a longitudinal direction of the machine 4, and FIG. 9 illustrates a partial longitudinal cross section of the sixth embodiment of the moving set 100.

The first cylindrical magnetic mass 24 is segmented in first segments 24a, 24b, 24c, 24d, 24e, 24f.

Similarly, the second cylindrical magnetic mass 25 is segmented in second segments. For reasons of clarity, only a second segment 25a is represented.

In variant, only one magnetic mass of the first and second magnetic masses 24, 25 is segmented.

Each first segment 24, 24b, 24c, 24d, 24e, 24f comprises a first stack of segmented laminated magnetic sheets 27a and a first support part 46 separating the first stack in two sets of laminated magnetic sheets 27.

As represented, the first support part 46 may be in the middle of the first stack.

Similarly, each second segment 25a comprises a second stack of segmented laminated magnetic sheets 27a and a second support part 47 separating the second stack in two sets of laminated magnetic sheets 27.

Each segment of the first segments 24a, 24b, 24c, 24d, 24e, 24f and second segments 25a comprises two segments 28b of segmented compaction plates so that the segmented laminated magnetic sheets 27 of each first and second segments is compacted between the two segments 28b of segmented compaction plates.

Each segment of the first segments 24a, 24b, 24c, 24d, 24e, 24f and second segments 25a further comprises two segments 29b of segmented short circuit disks and the conductive bars 31 lodged in the housing 30 so that the first segments 24, 24b, 24c, 24d, 24e, 24f of the first magnetic mass 24 form the first squirrel cage and the second segments 25a of the second magnetic mass 25 form the second squirrel cage. The machine 4 is an asynchronous squirrel cage comprising two rotors.

Tie rods 72 passing thought the laminated magnetic sheets 27a, the segment 28b of the segmented compaction plates, the segment 29b of the segmented short circuit disks, and the support parts 46, 47 maintain the first and second stacks compacted between the segments 29b of the short circuit disks 29 and the segments 28b of the compaction plates.

The tie rods 72 are for example fixed with nuts 48 on the segments 28b of the compaction plates 28.

The shaft 5 may comprise the first shaft collar 34 comprising the first shoulder 36 and the second shaft collar 35 comprising the second shoulder 37.

The first support part 46 is in abutment against the first shoulder 36 and is fixed on the first shaft collar 34 with the first fixing means comprising for example the screws 38.

The second support part 47 is in abutment against the second shoulder 37 and is fixed on the second shaft collar 35 with the second fixing means comprising for example the screws 38.

The splitting of the magnetic mass 24, 25 in segments 24, 24b, 24c, 24d, 24e, 24f, 25a permits to easily transport the moving set 100 in a plurality of parts and to facilitate the maintenance of the machine 4.

If the moving set 100 is defect, only the defect segment(s) 24, 24b, 24c, 24d, 24e, 24f, 25a need to be dismounted and repaired or replaced.

In variant, the first and second squirrel cages may be replaced with permanent magnets to form a permanent magnet machine having two rotors.

In another variant, the first and second squirrel cages may be replaced by coils to form an asynchronous wounded machine having two rotors or a synchronous wounded machine having two rotors.

Figure 10:
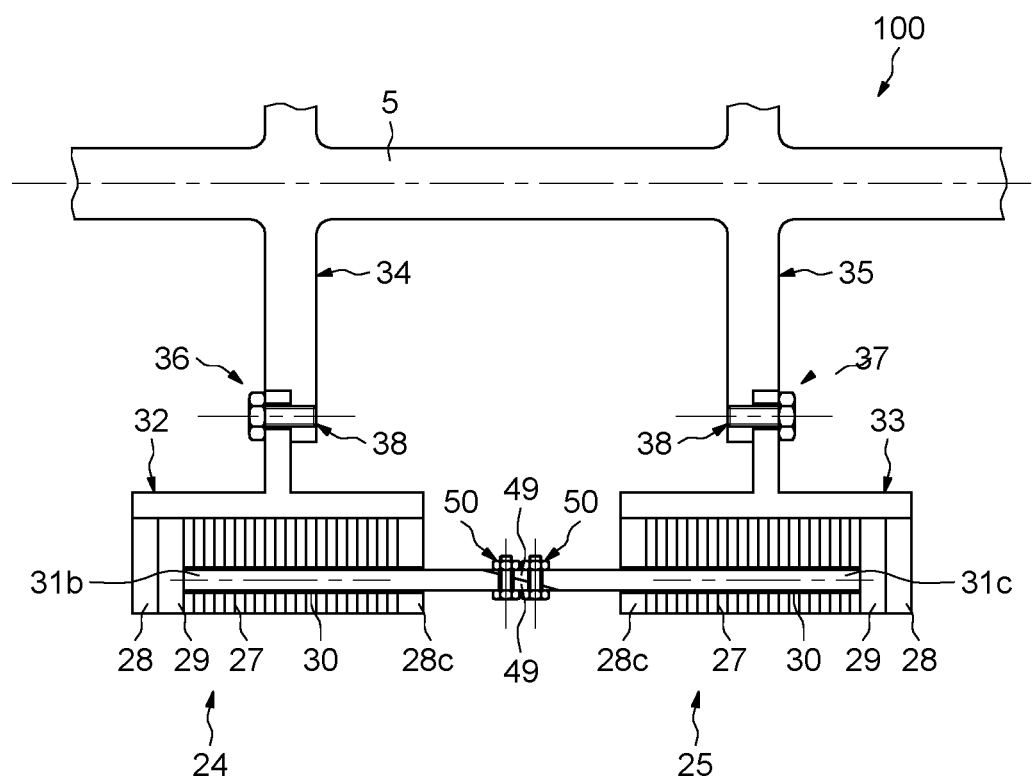
FIG. 10 illustrates a partial longitudinal cross section of a seventh example of the moving set according to the invention.

FIG. 10 illustrates a partial longitudinal cross section of a seventh embodiment of the moving set 100.

The seventh embodiment of the moving set 100 differs from the first embodiment of the moving set 100 illustrated on FIG. 2 in that each conductive bar 31b of the first set of conductive bars 31 of the first magnetic mass 24 is connected to a different conductive bar 31c of the second set of conductive bars 31 of the second magnetic mass 25, in that each magnetic mass 24, 25 comprises a perforated compaction plate 28c replacing a compaction plate 28 so that the conductive bars 31b, 31c may be joined together, and in that each magnetic mass 24, 25 comprises only one short circuit disk 29.

The bars 31b of the first set of conductive bars 31, the bars 31c of the second set of conductive bars 32, and the short circuit disks 29 form a squirrel cage so that the first and second cylindrical magnetic masses form a squirrel cage rotor, the machine 4 being an asynchronous machine having one rotor.

The number of short circuit disks 29 is divided by two compared to the first embodiment of the moving set 100 illustrated on FIG. 2 so that the weight of the moving set 100 is less than the weight of the first embodiment of the moving set 100.

The end of each conductive bar 31b of the first set in contact with a conductive bar 31c of the second set and the end of each conductive bar 31c of the second set in contact with a conductive bar 31b of the first set may comprise a slanted side 49 to compensate an axial or radial offset between the conductive bar 31b of the first set and the conductive bar 31c of the second set.

The conductive bars 31b, 31c may be fixed together with bolts 50.

In variant, the slanted sides 49 of the conductive bars 31b, 31c are welded or brazed.

The connection of the conductive bars 31a, 31b of the first set and the second set together permits to reduce the air gap 26a between the first and second magnetic masses 24, 25 according to the embodiment of magnetic masses 24, 25 illustrated on FIG. 3 comprising the conductive bars 31a, 31b exceeding the compaction plates 29a so that the moving set 100 is more compact and lighter.

The machine 4 comprising the magnetic masses 24, 25 according to the embodiment of the magnetic masses 24, 25 illustrated on FIG. 3 wherein the conductive bars 31a, 31b of the first set and the second set are connected together is lighter and more compact.

In variant, each pair of conductive bars 31a, 31b of the first set and the second set connected together is replaced by a unique bar so that the set of unique bars and the short circuit disks 29 of the first and second magnetic masses 24, 25 form the squirrel cage.

When the magnetic masses 24, 25 is made according to the embodiment of magnetic masses 24, 25 illustrated on FIG. 3, the two magnetic masses 24, 25 are fixed on the shaft 5.

The unique bars are inserted in the housings 30 according to the longitudinal direction.

For each insertion of a unique bar, the shaft may be rotated so that the housings 30 are sequentially in line with a tooling inserting the unique bar in the housings 30.

When the first magnetic mass 24 comprises a first set of coils and the second magnetic mass 25 comprises a second set of coils, one end of a coil of the first set of coils may be connected to one end of a coil of the second set of coils with for example a flexible junction forming a wounded rotor so that the machine 4 may be an asynchronous wounded machine or a synchronous wounded machine comprising one rotor.

In variant, each pair of coils of the first set of coils and the second set of coils connected together is replaced by a unique coil.

Figure 11:
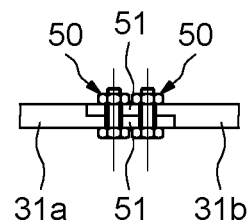
FIG. 11 illustrates another embodiment of the ends of conductive bars according to the invention.

FIG. 11 illustrates another embodiment of the ends of the conductive bars of the first and second sets connected together.

Each end of the conductive bars 31c, 31d of the first and second sets comprises a shim 51 to compensate an angular offset between the said conductive bars 31a, 31b.

The conductive bars 31c, 31d may be fixed together with bolts 50.

In variant, the shims 51 of the conductive bars 31b, 31c are welded or brazed.

Figure 12:
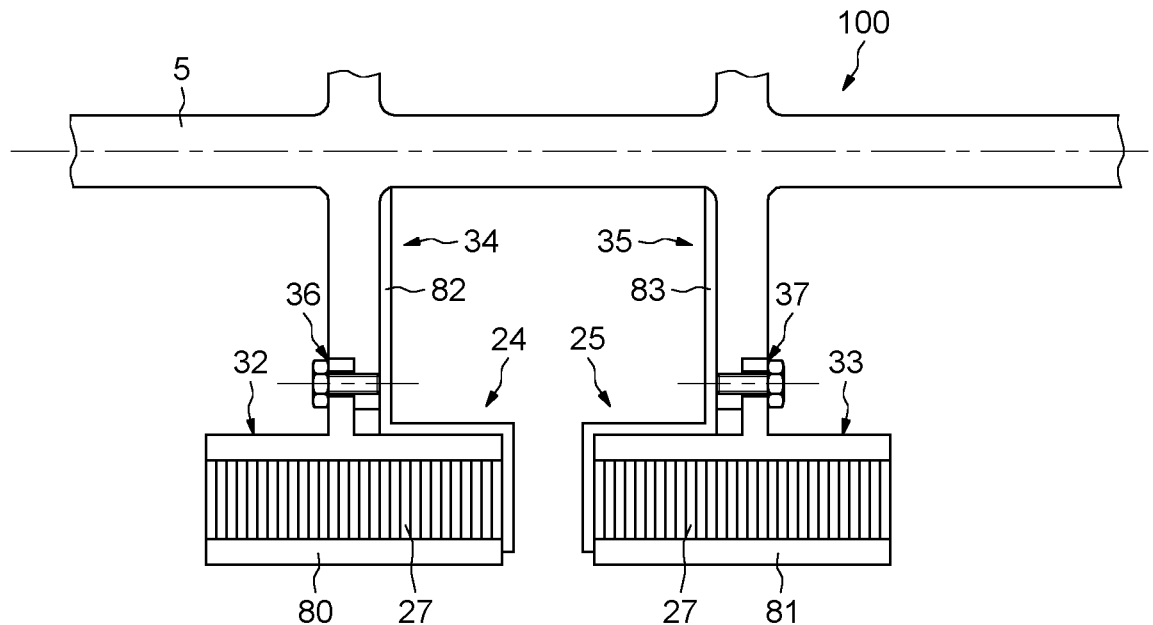
FIG. 12 illustrates a partial longitudinal cross section of an eighth example of the moving set according to the invention.

FIG. 12 illustrates a partial longitudinal cross section of an eighth embodiment of the moving set 100.

The eighth embodiment of the moving set 100 differs from the first embodiment of the moving set 100 illustrated on FIG. 2 in that the first squirrel cage of the first magnetic mass 24 and the second squirrel cage of the second magnetic mass 25 are respectively replaced by a first set of coils 80 and a second set of coils 81.

The first set of coils 80 is regularly disposed according to a diameter of the first magnetic mass 24 and the second set of coils 81 is regularly disposed according to a diameter of the second magnetic mass 25.

The first and second set of coils 80, 81 are supplied respectively by first and second supply means 82, 83 comprising for example wires.

The machine 4 is a synchronous machine comprising two wounded rotors, a first rotor comprising the first magnetic mass 24 and the second rotor comprising the second magnetic mass 25.

In variant, the first and second set of coils 80, 81 are supplied by a same supply means.

In another, each coil of the first of coils 80 is connected with a different coil of the second of coils 81 to form one rotor, the machine 4 being a synchronous machine comprising one wounded rotor.

Two or more of the embodiments of the movable set 100 represent on the FIGS. 2, 3, 4, 5, 7, 8, 9, 10, 11, 12 may be combined.

Figure 13:
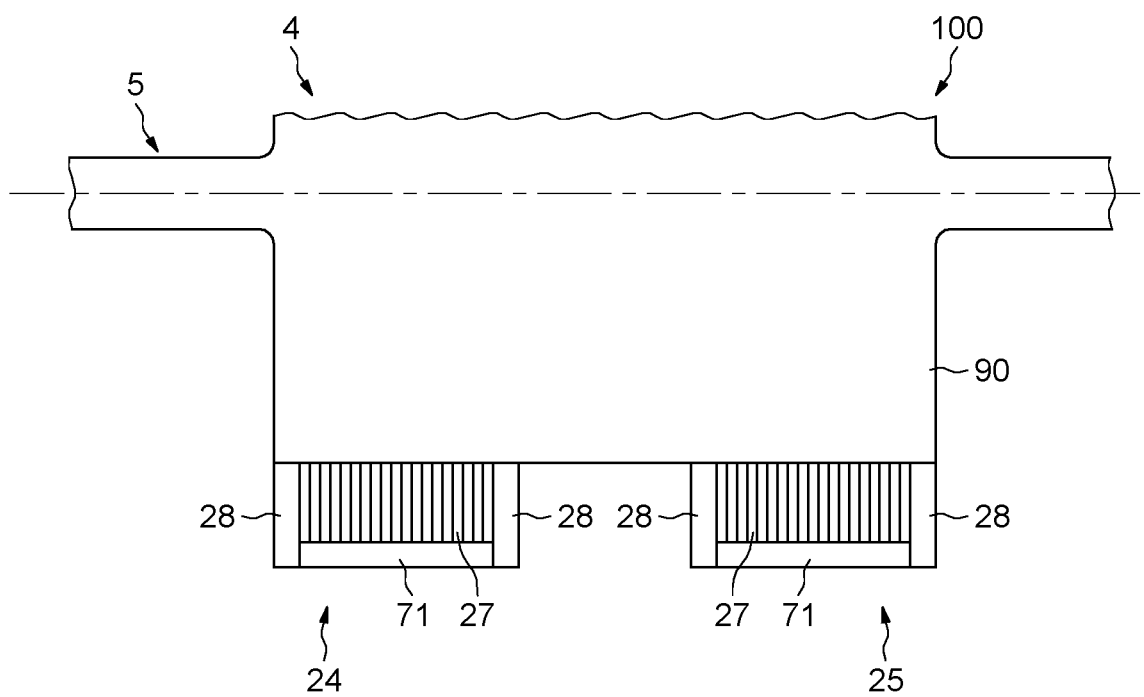
FIG. 13 illustrates a partial longitudinal cross section of a ninth example of the moving set according to the invention.

FIG. 13 illustrates a partial longitudinal cross section of a ninth embodiment of the moving set 100.

The shaft 5 is a single shaft comprising a shaft collar 90.

The first and second magnetic masses 24, 25 are fixed on the periphery of the shaft collar 90 respectively with the first and second fastening means comprising for example screws (not represented).

The first and second magnetic masses 24, 25 comprise the laminated magnetic sheets 27 compacted between the two compaction plates 28 and are fixed on the periphery of the shaft collar 90.

Each magnetic mass 24, 25 may further comprise the permanent magnets 71 so that the shaft 5 and the first and second magnetic masses 24, 25 form two permanent magnet rotors, the machine 4 being a permanent magnet machine having two rotors.

In variant, the permanent magnets 71 may be replaced by a squirrel cage to form an asynchronous squirrel cage machine having two rotors.

In another variant, the permanent magnets 71 may be replaced by coils to form an asynchronous wounded machine having two rotors or a synchronous wounded machine having two rotors.

In another embodiment (not illustrated), the rotating electrical machine 4 may be mounted in series with another rotating electrical machine as described above, the shaft 5 of the rotating electrical machine 4 being connected to the shaft of the other machine forming a set of rotating electrical machines.

Figure 14:
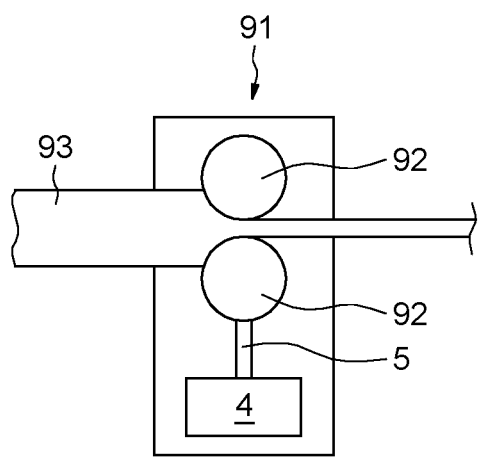
FIG. 14 illustrates an example of a rolling mill according to the invention.

FIG. 14 illustrates an example of a rolling mill 91 comprising two rolls 92 driven by the machine 4.

A strand of steel 93 is inserted between the two rolls 92 to be laminated.

The invention claimed is:

1. A rotating electrical machine, comprising:
a stator;
a shaft centered in the stator; and
a first cylindrical magnetic mass and a second cylindrical magnetic mass, the first cylindrical magnetic mass and the second cylindrical magnetic mass enclosing the shaft and arranged in series on the shaft, the first cylindrical magnetic mass and the second cylindrical magnetic mass being separated by an air gap, the stator including coils, each coil being opposite to the two cylindrical magnetic masses, each cylindrical magnetic mass comprising a stack of compacted laminated magnetic sheets, a first fastener configured to fix the first cylindrical magnetic mass and the shaft, and a second fastener configured to fix the second cylindrical magnetic mass and the shaft, a diameter of the first cylindrical mass being equal to a diameter of the second cylindrical mass, the rotating electrical machine further comprising a hollow cylindrical support part, the shaft comprising a first half shaft and a second half shaft, the cylindrical support part being inserted between the first half shaft and the second half shaft, and the first cylindrical magnetic mass and the second cylindrical magnetic mass being fixed on the periphery of the cylindrical support part,
the first and second fasteners comprising the hollow cylindrical support part.

2. The rotating electrical machine according to claim 1, wherein each cylindrical magnetic mass comprises a set of coils so that the first cylindrical magnetic mass forms a first wounded rotor and the second cylindrical magnetic mass forms a second wounded rotor.

3. The rotating electrical machine according to claim 1, wherein each cylindrical magnetic mass comprises a set of coils, each coil of the set of coils of the first cylindrical magnetic mass being connected to a different coil of the set of coils of the second cylindrical magnetic mass so that the first and second cylindrical magnetic masses form a wounded rotor.

4. The rotating electrical machine according to claim 1, wherein each cylindrical magnetic mass comprises conductive bars and two short circuit disks or two short circuit rings to form a squirrel cage, the first cylindrical magnetic mass forming a first squirrel cage rotor and the second cylindrical magnetic mass forming a second squirrel cage rotor.

5. The rotating electrical machine according to claim 1, wherein the first cylindrical magnetic mass comprises a first set of conductive bars and a first short circuit disk and the second cylindrical magnetic mass comprises a second set of conductive bars and a second short circuit disk, each conductive bar of the first set being connected to the first short circuit disk and to a different conductive bar of the second set, the conductive bars of the second set being connected to the second short circuit disk, the first and second sets and the first and second short circuit disks forming a squirrel cage so that the first and second cylindrical magnetic masses form a squirrel cage rotor.

6. The rotating electrical machine according to claim 5, wherein the end of each conductive bar of the first set and the second set in contact with another conductive bar comprises a slanted side.

7. The rotating electrical machine according to claim 1, further comprising a third full rim and a fourth full rim enclosing the shaft, the first cylindrical magnetic mass being fixed on the periphery of the third full rim with the first fastener, and the second cylindrical magnetic mass being fixed on the periphery of the fourth full rim with the second fastener.

8. The rotating electrical machine according to claim 1, wherein at least one magnetic mass of the first cylindrical magnetic mass and the second cylindrical magnetic mass is segmented in segments, each segment comprising a stack of segmented laminated magnetic sheets and a segmented support part separating the stack in two sets of segmented laminated magnetic sheets, a respective first or second fastener associated with one magnetic mass fixing each support part on the shaft.

9. A set of rotating electrical machines comprising at least a first rotating electrical machine and a second rotating electrical machine according to claim 1, the shaft of the first rotating electrical machine being connected to the shaft of the second rotating electrical machine.

10. A boat comprising at least one rotating electrical machine according to claim 1.

11. A rolling mill comprising at least one rotating electrical machine according to claim 1.

12. A rotating electrical machine, comprising:
a stator;
a shaft centered in the stator; and
a first cylindrical magnetic mass and a second cylindrical magnetic mass, the first cylindrical magnetic mass and the second cylindrical magnetic mass enclosing the shaft and arranged in series on the shaft, the first cylindrical magnetic mass and the second cylindrical magnetic mass being separated by an air gap, the stator including coils, each coil being opposite to the two cylindrical magnetic masses, each cylindrical magnetic mass comprising a stack of compacted laminated magnetic sheets, a first fastener configured to fix the first cylindrical magnetic mass and the shaft, and a second fastener configured to fix the second cylindrical magnetic mass and the shaft;
a first full rim including a first central circular aperture, the first magnetic mass being fastened on the periphery of the first full rim;
a second full rim including a second central circular aperture, the second magnetic mass being fastened on the periphery of the second full rim;
a first shaft collar and a second shaft collar on the shaft, wherein:
the first fastener comprises a first shoulder on the periphery of the first shaft collar and first fixing means;

the first full rim is into abutment against the first shoulder and is fixed to the first shaft collar by the first fixing means;

the second full rim is into abutment against the second shoulder and is fixed to the second shaft collar by a second fixing means;

the first shoulder comprises a first cylindrical surface in contact with the circumferential surface of the first central circular aperture and a first annular surface perpendicular to the first cylindrical surface in contact with the first full rim; and a second shoulder comprises a second cylindrical surface in contact with the circumferential surface of the second central circular aperture and a second annular surface perpendicular to the second cylindrical surface and in contact with the second rim.

13. The rotating electrical machine according to claim 12, wherein the diameter of the first shaft collar is smaller than the diameter of the second cylindrical surface, and the first and second shoulders are oriented on the first and second shaft collars so that the second annular surface is facing the surface of the first shoulder opposite to the first annular surface of the first shoulder.

14. The rotating electrical machine according to claim 12, wherein the shaft comprises two half shafts, and wherein one shaft collar of the first and second shaft collars comprises two parts, a first half shaft comprising a first part and the second half shaft comprising the second part, the first part comprising the annular surface or the cylindrical surface of the shoulder of the said one shaft collar and the second part comprising the cylindrical surface or the annular surface of the shoulder of the said one shaft collar, the first and second half shafts being removably fixed together with the second fastener to form the shoulder of the said shaft collar, the first half shaft or the second half shaft comprising the other shaft collar of the first and second shaft collars.

* * * * *